(12) United States Patent
Komiya

(10) Patent No.: US 7,119,273 B2
(45) Date of Patent: Oct. 10, 2006

(54) CABLES OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/252,929

(22) Filed: Oct. 18, 2005

(65) Prior Publication Data

US 2006/0096772 A1    May 11, 2006

(30) Foreign Application Priority Data

Nov. 8, 2004    (JP) .............................. 2004-323610

(51) Int. Cl.
*H02G 15/22*    (2006.01)
(52) U.S. Cl. ......................... 174/19; 59/78.1
(58) Field of Classification Search .................. 174/19, 174/68.3; 59/78.1, 900
See application file for complete search history.

(56) References Cited

U.S. PATENT DOCUMENTS

| 4,104,871 A * | 8/1978 | Moritz ........................ 59/78.1 |
| 4,962,639 A | 10/1990 | Blase |
| 5,014,506 A | 5/1991 | Moritz |

FOREIGN PATENT DOCUMENTS

| EP | 1 463176 A1 | 9/2004 |
| JP | 2548610 | 8/1996 |
| JP | 2000055140 | 2/2000 |
| JP | 2000120807 A | 4/2000 |
| WO | WO2004/092614 A1 | 10/2004 |

OTHER PUBLICATIONS

British Search Report, Dec. 9, 2005, British.

* cited by examiner

*Primary Examiner*—Chau N. Nguyen
(74) *Attorney, Agent, or Firm*—Woodling, Krost and Rust

(57) ABSTRACT

A cable or the like protection and guide device is provided in which a partitioning shelf plate member can be easily attached and detached and the damage of the cover of the cables or the like and the dropping of the shelf plate member can be prevented. In a cables or the like protection and guide device (100) in which partitioning wall formation members (130), which sort the cables or the like C in said cables or the like accommodation space R into right and left and a partitioning shelf plate member (120), which sorts the cables or the like C in said cables or the like accommodation space R into a bending inner circumferential side and a bending outer circumferential side are detachably attached to each other, the partitioning wall formation member (130) includes a plurality of shelf mounting protrusions (133), arranged in multi-steps in a non-contact state with the cables or the like C and forming a part of a partitioning wall surface, and said partitioning shelf plate member 120 includes protrusion engaging adapters (122), which engage with said shelf mounting protrusions (133) on longitudinal both ends of the partitioning shelf plate member.

3 Claims, 8 Drawing Sheets

CABLES OR THE LIKE PROTECTION AND GUIDE DEVICE

This patent application claims priority to Japanese Patent Application 2004-323610 filed Nov. 8, 2004.

FIELD OF THE INVENTION

The present invention relates to a cables or the like protection and guide device, and more specifically relates to a cables or the like protection and guide device, which accommodates cables or the like such as cables or hoses which supply a movable member of an industrial machine with energy such as electric power or compressed air, and stably, reliably guides and supports the cables or the like during movement of a movable portion.

BACKGROUND ART

Related Art

A Cables or the like protection and guide device, which sorts cables or the like into multi-steps in a cables or the like accommodation space has been known. The conventional cables or the like protection and guide device includes a wedge-shaped holding groove portion in a sorting web and has a structure in which a fixed lug of an intermediate web is fixed to the holding groove portion. Further, the conventional cables or the like protection and guide device provides a fixed stud different from the above-mentioned fixed lug in the intermediate web, and prevents the intermediate web from dropping off the partitioning web with the fixed stud and a fixed hole portion by providing the fixed hole portion in the sorting web so as to correspond to the fixed stud (see for example Patent Reference 1).

Patent Reference 1 is publication of Japanese Patent No. 2548610.

PROBLEMS TO BE SOLVED BY THE INVENTION

However, if in the conventional cables or the like protection and guide device, the partitioning web is not fixed with a lateral web closed, an attachment operation of an intermediate web is impossible. Further, if an engagement of the fixed stud must be released by simultaneously twisting a pair of partitioning webs to which the intermediate web is attached, the intermediate web cannot be removed. Thus, in a case where a lateral web-closed partitioning web is fixed at the exchange of cables or the like, a removing operation of the intermediate web was impossible.

Further, in the conventional cables or the like protection and guide device, the intermediate web can drop off from a partitioning web due to the weight of the cables or the like in a use form where cables or the like are inserted into multi-steps. Accordingly, it was impossible to incorporate the intermediate webs so as to be continuous to each other in multi-steps.

That is in the conventional cables or the like protection and guide device, not only there is a problem that attachment and detachment operations of partitioning shelf plate members composed of intermediate webs to partitioning wall formation members composed of partitioning webs are troublesome, but also there is a problem that a partitioning shelf plate member can drop off from the partitioning wall formation member.

Further, in the conventional cables or the like protection and guide device, there is a problem that cables or the like come into contact with a corner of a holding groove portion provided in the partitioning wall formation member composed of the partitioning web to damage a cover of the cables or the like.

Thus the present invention was made to solve the above-mentioned problems, that is the object of the present invention is to provide a cables or the like protection and guide device, in which a partitioning shelf plate member can be easily attached and detached and the damage of the cover of the cables or the like and the dropping of the shelf plate member can be prevented.

MEANS FOR SOLVING THE PROBLEMS

To attain the above-mentioned objects in the invention according to claim 1 a cables or the like protection and guide device in which a number of link frame bodies each having a rectangular frame cross-section and bridged connecting plates over bending inner and outer circumferential sides of right and left pair of link plates are flexibly connected to each other with connecting pins and connecting pin holes provided in said link plates to form a cable or the like accommodation space where inserted the cable or the like is guided and protected, and in which partitioning wall formation members, which sort the cables or the like in said cables or the like accommodation space into right and left and a partitioning shelf plate member, which sorts the cables or the like in said cables or the like accommodation space into a bending inner circumferential side and a bending outer circumferential side are detachably attached to each other, is characterized in that said partitioning wall formation member includes a plurality of shelf mounting protrusions, arranged in multi-steps in a non-contact state with the cables or the like and forming a part of a partitioning wall surface, and that said partitioning shelf plate member includes protrusion engaging adapters, which engage with said shelf mounting protrusions on longitudinal both ends of the partitioning shelf plate member.

Further, in a cables or the like protection and guide device according to claim 1 or 2 the above-mentioned objects are attained by the fact that said protrusion engaging adaptor includes diverged two locking hole portions, which engage with vertically adjacent two said shelf mounting protrusions, in addition to the construction of the invention of claim 1.

Further, in a cables or the like protection and guide device according to claim 3 the above-mentioned objects are attained by the fact that said protrusion engaging adaptor includes diverged two locking hole portions, which engage with vertically adjacent two said shelf mounting protrusions, in addition to a construction of the invention of claim 1 or claim 2.

EFFECT OF THE INVENTION

According to the invention of claim 1, since the partitioning wall formation member of a cables or the like protection and guide device includes a plurality of shelf mounting protrusions, arranged in multi-steps in a non-contact state with the cables or the like and forming a part of a partitioning wall surface, the contact between the inserted cables or the like and the shelf mounting protrusion is avoided so that damage of the cables or the like in a cover portion can be prevented. Further, since the protrusion engaging adaptors of the partitioning shelf plate member are provided on longitudinal both ends of the partitioning shelf member, the protrusion engaging adaptors are caused to engage with desired shelf mounting protrusions so that the attachment and detachment of the partitioning wall formation member and the partitioning shelf plate member can be easily attained.

Further, according to the invention of claim 2, in addition to the effect exerted by the invention of claim 1, since said shelf mounting protrusion includes a convex dropping prevention portion around the protrusion, and said protrusion engaging adaptor includes a concave dropping prevention portion, which fits to the convex dropping prevention portion of said shelf mounting protrusion, the convex dropping prevention portion of the partitioning wall formation member engages with the concave dropping prevention portion of the partitioning shelf plate member so that the partitioning shelf plate member can be prevented from dropping off from the partitioning wall formation member.

Further, according to the invention of claim 3, in addition to the effect exerted by the invention of claims 1 or 2, since said protrusion engaging adaptor includes diverged two locking hole portions, which engage with vertically adjacent two said shelf mounting protrusions, even if the load of cables or the like applied to the partitioning shelf plate member is large, the partitioning shelf plate member is prevented from dropping off from the partitioning wall formation member whereby the damage of the partitioning wall formation member and the partitioning shelf plate member can be prevented.

A better understanding of the DRAWINGS will be had when reference is made to the DESCRIPTION OF THE INVENTION and CLAIMS which follow hereinbelow.

DESCRIPTION OF THE INVENTION

Embodiments of the cables or the like protection and guide device according to the present invention will be described with reference to the attached drawings below.

Figure 1:
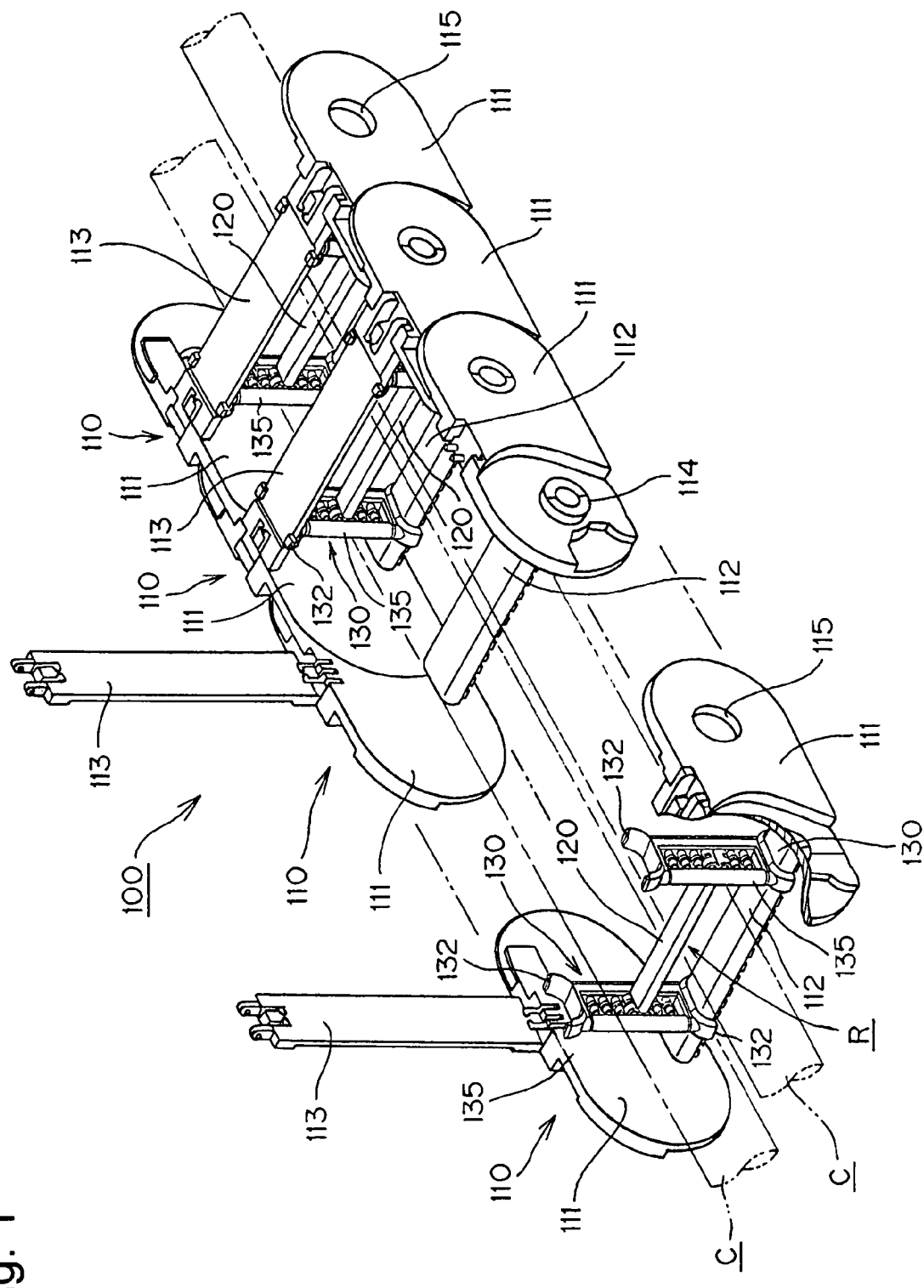
FIG. 1 is a perspective view of a cables or the like protection and guide device, which is a first example according to the present invention.
Figure 2:
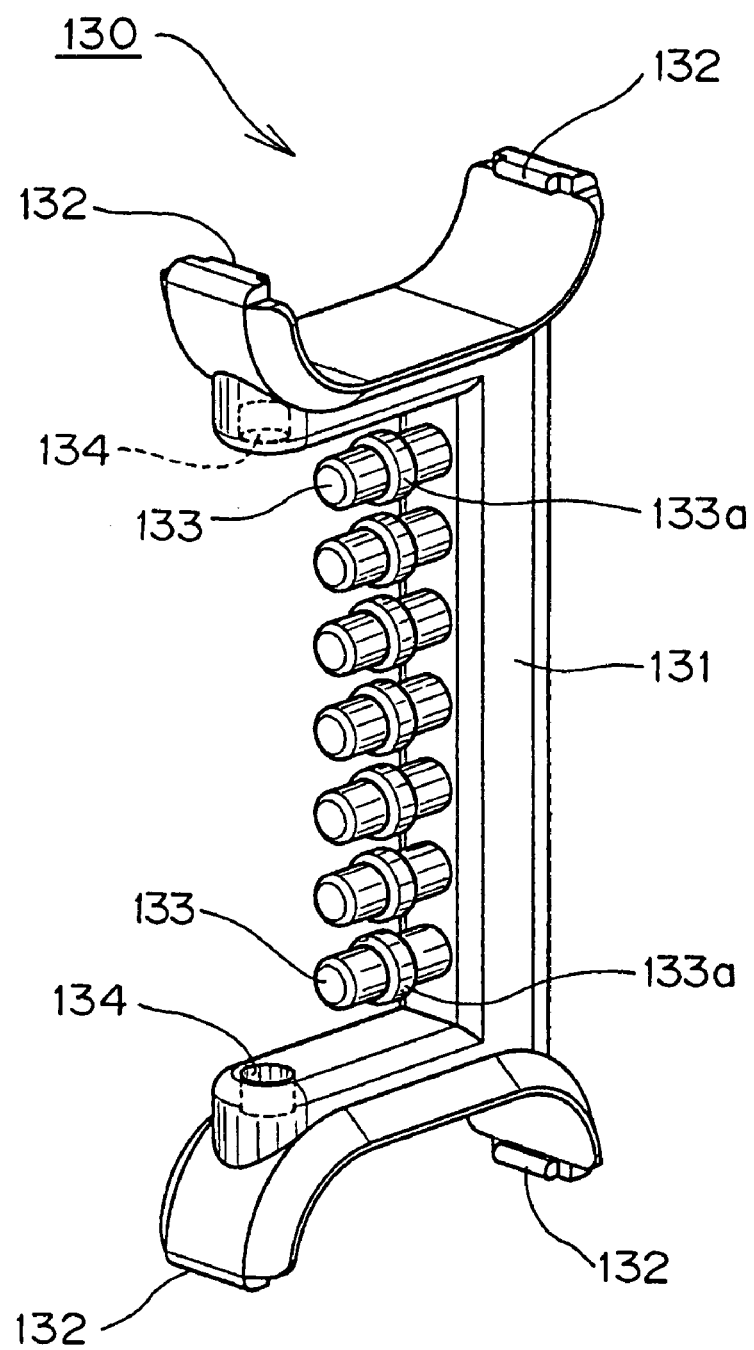
FIG. 2 is a perspective view of a partitioning wall formation member shown in FIG. 1.
Figure 3:
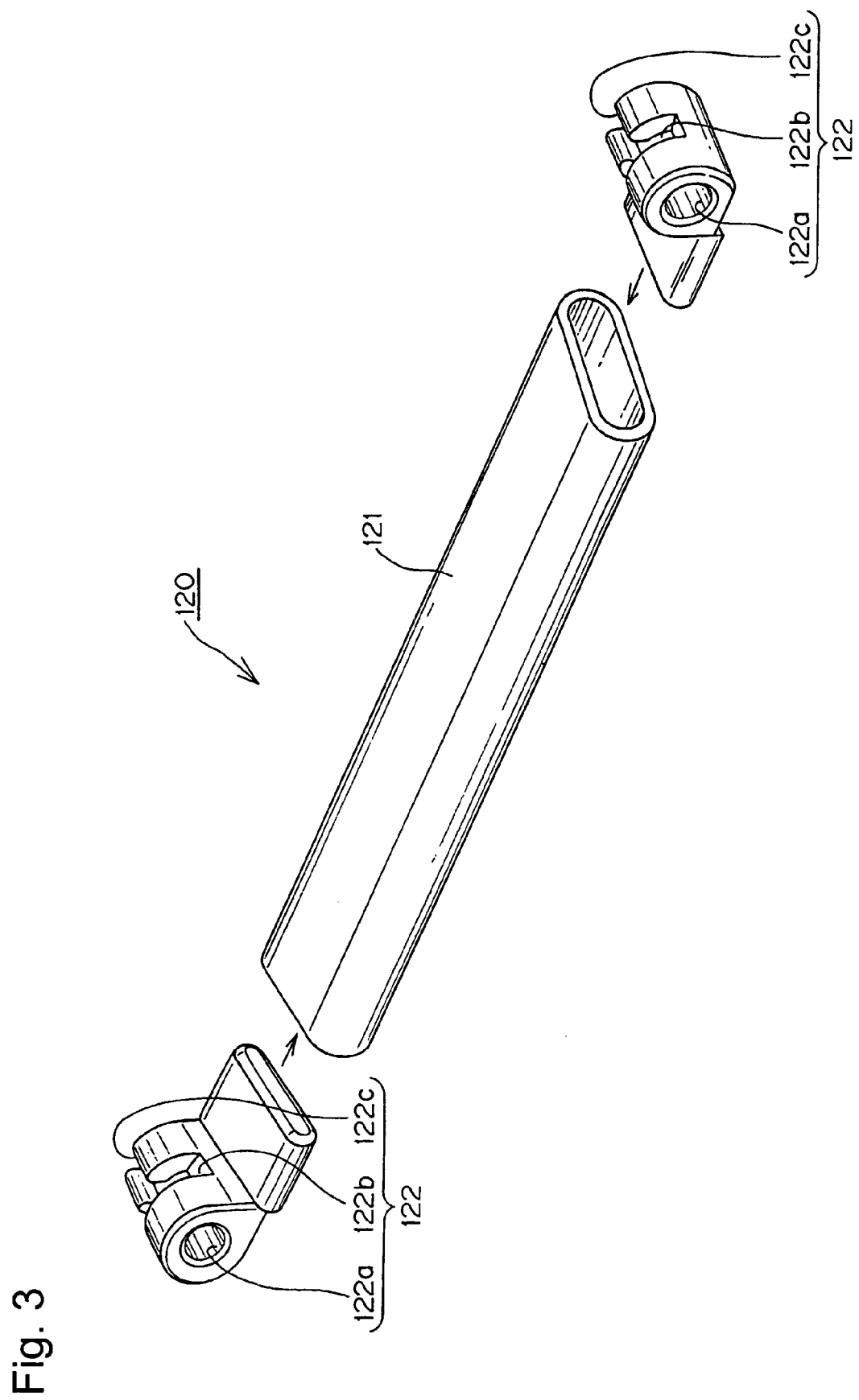
FIG. 3 is a perspective view of a partitioning shelf plate member shown in FIG. 1.
Figure 4:
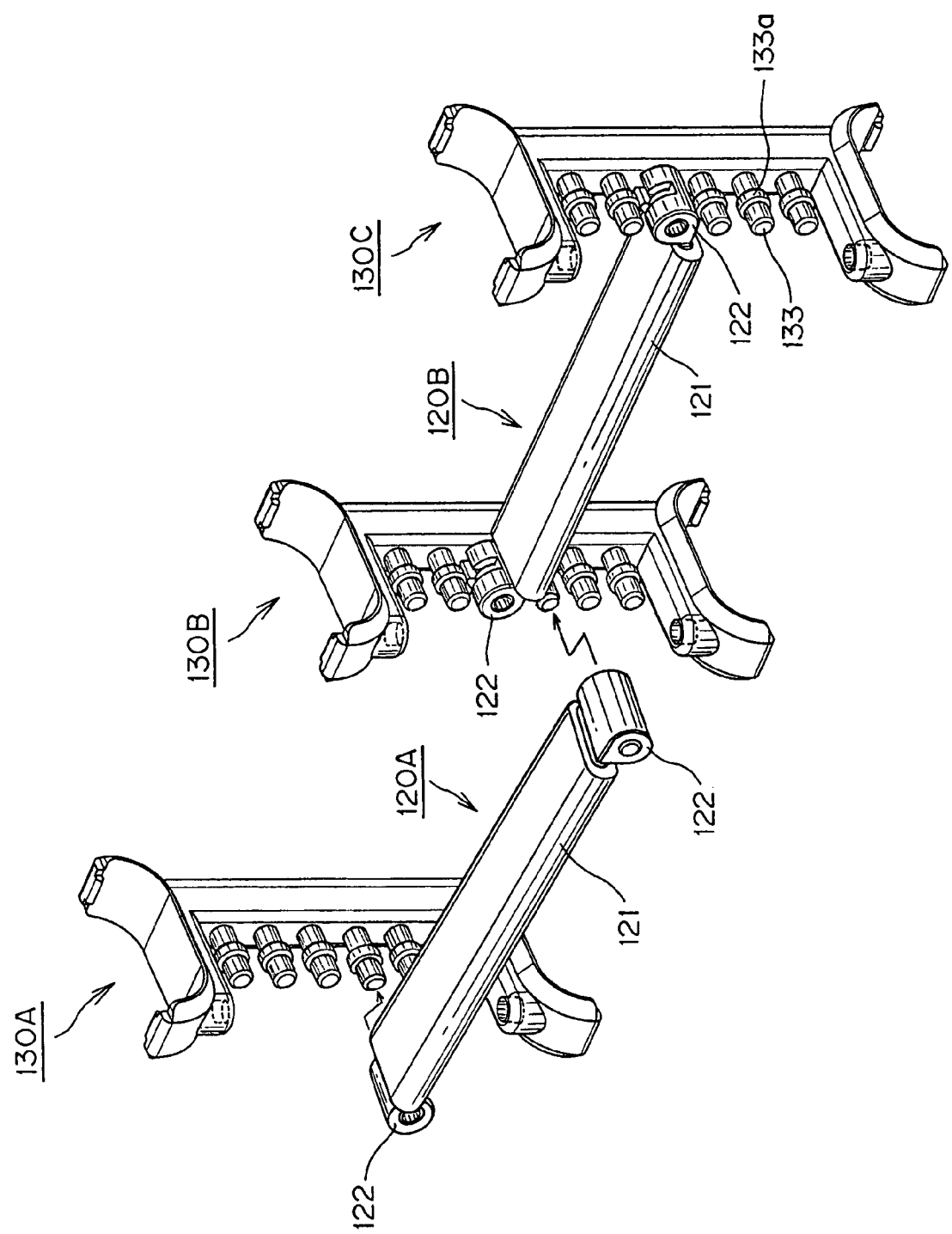
FIG. 4 is a view showing an incorporation state of the partitioning shelf plate member 120 and the partitioning wall formation member.
Figure 5:
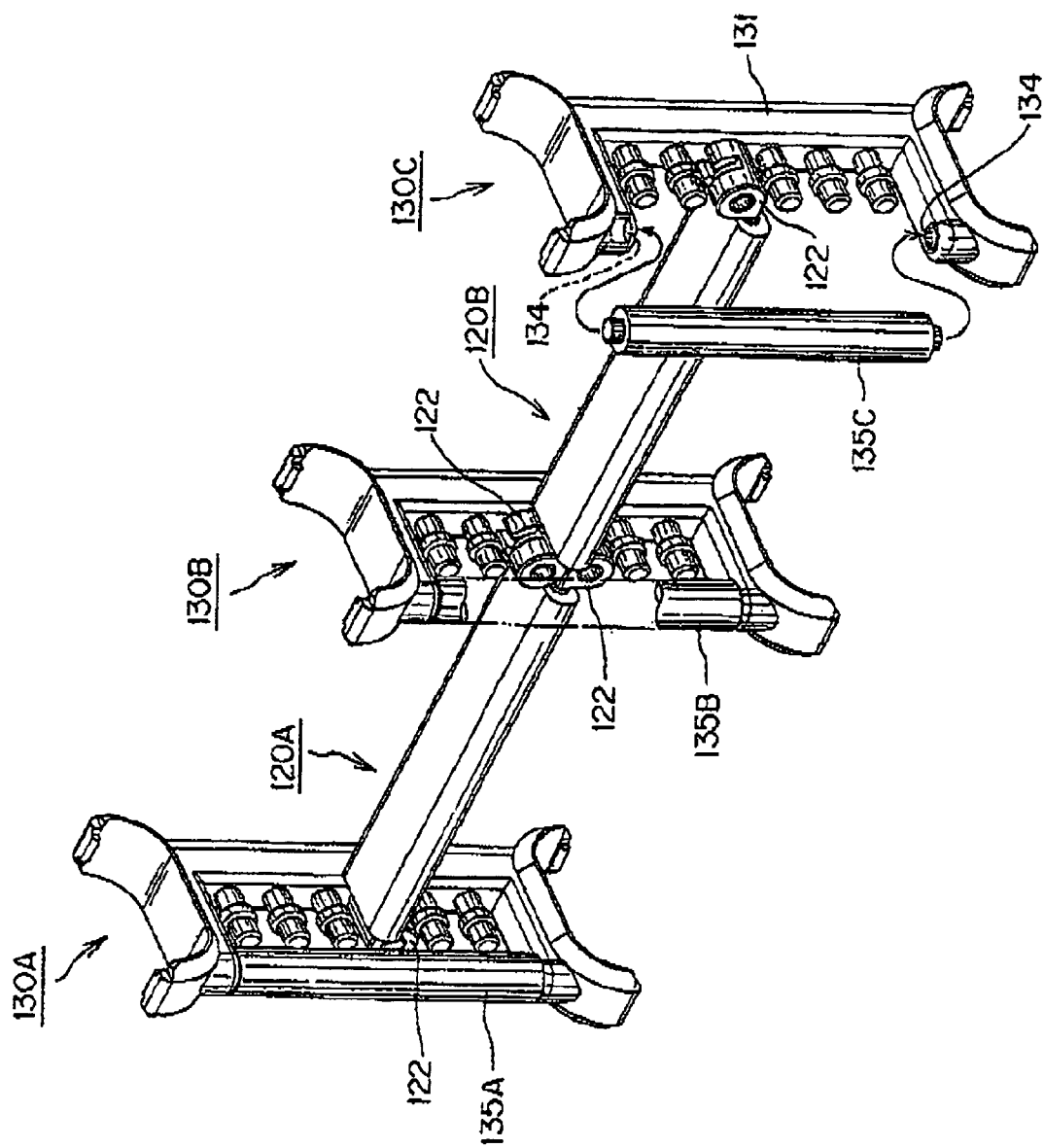
FIG. 5 is a view showing an incorporation state of free rolls.

FIG. 1 is a perspective view of a cables or the like protection and guide device 100, which is a first example of the present invention, FIG. 2 is a perspective view of a partitioning wall formation member 130 used in the first example, FIG. 3 is a perspective view of a partitioning shelf plate member 120 used in the first example, FIG. 4 is a view showing an incorporation state of the partitioning shelf plate member 120 and the partitioning wall formation member 130, and FIG. 5 is a view showing an incorporation state of free rolls 135.

The cables or the like protection and guide device 100, which is the first example of the present invention as shown in FIG. 1 is used for protecting and guiding cables or the like C such as electric cables, which perform transmission of electric signals and supply of power to a chip mounter for a semiconductor, a machine tool or for the connection between a movable section and a stationary section in a vehicle or the like, and hoses for supplying oil pressure or air pressure. And a number of rectangular frame bodies 110 in the cables or the like protection and guide device 100 are connected to each other in a continuous form, and the cables or the like protection and guide device 100 can exhibit a linear state or a flexed state in accordance with movement conditions between the movable section and stationary section (not shown) and can protect and guide cables or the like C while inserting the cables or the like C in a cables or the like accommodation space R formed by the continuously connected these link frame bodies 110.

The link frame body 110 is molded of, for example, a glass fiber reinforced polyamide resin, which can exhibit excellent strength properties, and is integrated in a rectangular shape by spaced right and left pair of link plates 111, 111, a bending inner circumferential side connecting plate 112 bridged over the bending inner circumferential sides of the link plates 111, 111 and a bending outer circumferential side connecting plate 113 bridged over the bending outer circumferential sides of the link plates 111, 111.

That is the bending inner circumferential side connecting plate 112 is integrated with the right and left pair of link plates 111, 111 by injection molding. However, one end of the bending outer circumferential side connecting plate 113 is pivotably connected to the one link plate 111 and the other end of the bending outer circumferential side connecting plate 113 can be opened and closed so that it can engages with the other link plate 111.

And a front side of the link plate 111 and a rear side thereof form a step in the thickness direction of the plate, so called an offset structure. Further, a rear side of the link plate 111 is provided with a connecting pin 114 and a front side thereof is provided with a connecting pin hole 115 having substantially the same diameter as the connecting pin 114.

Therefore, link frame bodies 110 are connected to each other by fitting connecting pins 114 of the link plates 111, 111 to connecting pin holes 115 thereof and can be adapted to flex about the connecting pin 114.

Thus, a partitioning structure in the link frame body 110, which is the most characteristic in the cables or the like protection and guide device 100 of the first example.

That is to the cables or the like protection and guide device 100 of the first example are detachably attached a partitioning shelf plate member 120, which sorts cables or the like C in a cables or the like accommodation space R into a bending inner circumferential side and a bending outer circumferential side every a pair of link plates 111 and a pair of partitioning wall formation members 130, which sorts the cables or the like C into a pair of link plate directions (hereinafter referred to as only "right and left directions").

Specifically, the partitioning wall formation members 130 is molded of a glass fiber reinforced polyamide resin or the like, which can exhibit excellent strength properties. And pawl portions 132, 132 respectively provided on the bending inner circumferential side and the bending outer circumferential side of a C-shaped frame 131 forming the partitioning wall formation members 130 are adapted to catch and hold a bending inner circumferential side connecting plate 112 and a bending outer circumferential side connecting plate 113, at desired positions, respectively.

The partitioning wall formation member 130 is provided with a plurality of shelf mounting protrusions 133, which are arranged in multi-steps in a non-contact state with the cables or the like C and form a part of the partitioning wall surface. Further, on the shelf mounting protrusions 133 are formed a convex dropping prevention portion 133a at substantially the center around the protrusion.

In the case of the first example, as the shelf mounting protrusion 133 a pin-shaped protrusion is adopted. However, if the shelf mounting protrusion 133 is received within a range of the thickness of the C-shaped flame 131 and can avoid the contact with the cables or the like C, any shapes of the shelf mounting protrusions 133 may be used instead of the above-mentioned shape.

As shown in FIGS. 3 and 4, the partitioning shelf plate member 120 mounted on the partitioning wall formation member 130 is provided with a shelf body 121, which sorts cables or the like C into a bending inner circumferential side and two protrusion engaging adaptors 122, 122 provided on both end portions of this shelf body 121, which engage with the shelf mounting protrusions 133.

And in the protrusion engaging adaptor 122 of the partitioning shelf plate member 120 is formed a locking hole portion 122a, which fit to the partitioning wall formation member 130. The diameter of the hole of the locking hole portion 122a is substantially the same as the diameter of the pin of the above-mentioned shelf mounting protrusions 133.

Further, in a protrusion engaging adaptor 122 is provided a concave dropping prevention portion 122b, which prevents the dropping of the partitioning shelf plate member 120 by engaging with the convex dropping prevention portion 133a of the above-mentioned partitioning wall formation member 130 with a part of the locking hole portion 122a opened. Further, a slit portion 122c, which is continuous to the concave dropping prevention portion 122b for elastic deformation, is provided by cutting off a part of the locking hole portion 122a so that insertion resistance generated on the fitting of the convex dropping prevention portion 133a of the partitioning wall formation member 130 is avoided.

Further, as shown in FIG. 5, to a bearing hole portion 134 provided on an opening side of the C-shaped frame 131 forming the partitioning wall formation member 130 is detachably attached a free roll 135, which avoids dropping of the partitioning shelf plate member 120 and damage of a cover of cables or the like C inserted into the cables accommodation space R. And a diameter of the free roll 135 is larger then the thickness of the C-shaped frame 131 of the partitioning wall formation member 130 and is adapted to avoid contact between the C-shaped frame 131 and the cables or the like C.

It is noted that since the shelf plate body 121 of the partitioning shelf plate member 120 in the first example is an extruded product of aluminum, it can be cut to arbitrary lengths so that the length can be easily controlled. Thus, it is not necessary to manufacture a number of resin injection molding molds fitting to every width of the link frame body unlike the conventional case and significant cost reduction can be attained. Then, even extruded products composed of a glass fiber reinforced polyamide resin and the like, which can exhibit excellent strength properties, other than the aluminum extruded product, can be substituted.

Although the protrusion engaging adaptor 122 of said partitioning shelf plate member 120 is composed of a resin molded product of a glass fiber reinforced polyamide resin or the like, which can exhibit excellent strength properties, other metallic molded products and the like may be used.

FIGS. 4 and 5 are views for explaining a modified example of the cables or the like protection and guide devices 100 shown in FIG. 1, and show a case where three partitioning wall formation members 130A, 130B, 130C and two partitioning shelf plate members 120A, 120B are assembled.

In this case, the three partitioning wall formation members 130A, 130B, 130C are respectively attached to bending inner circumferential side connecting plates 112 not shown. And the two partitioning shelf plate members 120A and 120B are attached to the partitioning wall formation members 130A, 130B, 130C in an oppositely arranged manner so that the height of these two partitioning shelf plate members 120A and 120B is on the same level.

As shown in FIGS. 3 and 4, the locking hole portions 122a, 122a of the two protrusion engaging adaptors 122 provided on both ends of the partitioning shelf member 120A are attached to the shelf mounting protrusions 133, 133 of the fourth step from the top of the partitioning wall formation members 130A and 130B so as to be fitted thereto. Alternatively, the locking hole portions 122a, 122a of the two protrusion engaging adaptors 122 provided on both ends of the partitioning shelf member 120B are attached to the shelf mounting protrusions 133, 133 of the third step from the top of the partitioning wall formation members 130B and 130C so as to be fitted thereto.

Then, as shown in FIG. 5, the partitioning shelf member 120A and the partitioning shelf member 120B are respectively attached between the partitioning wall formation members 130A and 130B and between the partitioning wall formation members 130B and 130C in an oppositely arranged manner, and free rolls 135A, 135B, 135C are pivotably attached to the partitioning wall formation members 130A, 130B, 130C. When these free rolls 135A, 135B, 135C are attached, as shown by the partitioning wall formation member 130C and the free roll 130C in FIG. 5, after the upper and lower ends of the partitioning wall formation member 130C are stretched up and down respectively to be deformed, so that a protrusion shaft portion of the free roll 135C is fitted into bearing hole portions 134, 134 of the partitioning wall formation member 130C. Thus the free roll 135 is pivotably provided in the partitioning wall formation member 130C.

Finally, the bending outer circumferential side connecting plate 113 is closed so that the partitioning wall formation members 130A, 130B, 130C are fixed.

The disassembling operation of the cables or the like protection device 100 of the present invention is possible by performing reverse steps of the above-mentioned assembling operation. That is the bending outer circumferential side connecting plate 113 is opened, the free rolls 135A, 135B, 135C are removed, and the partitioning shelf plate member 120A and the partitioning shelf plate member 120B are removed. Then, the partitioning wall formation members 130A, 130B, 130C are removed.

It is noted that since said free roll 135 is provided in the vicinity of the shelf mounting protrusion 133 of the partitioning wall formation member 130, even if the partitioning shelf plate member 120 is likely to drop or the protrusion engaging adaptor 122 of the partitioning shelf plate member 120 is likely come out with external force, the partitioning shelf plate member 120 or the protrusion engaging adaptor 122 comes into contact with the free roll 135 and it does not come out whereby the dropping off of the partitioning shelf plate member 120 can be prevented.

Further, the diameter of the free roll 135 is larger than the thickness of the C-shaped frame 131 of the partitioning wall formation member 130 and the contact between the C-shaped frame 131 and cables or the like C is avoided so that the cables or the like C comes into direct contact with pivotable free roll 135. Consequently, the cables or the like C does not come into contact with a corner portion of the partitioning wall formation member 130 and the shelf mounting protrusion 131 so that the damage of the cover of the cables or the like can be prevented.

As described above, according to the cables or the like protection and guide device of the first example, since a dropping prevention mechanism for the partitioning shelf plate member 120 with respect to the partitioning wall formation member 130 is formed between the convex dropping prevention portion 133a of the shelf mounting protrusion 133 and the concave dropping prevention portion 122a of the protrusion engaging adaptor 122, the contact between the inserted cables or the like C and the shelf mounting protrusion 133 is avoided whereby damage of the cover portion of the cables or the like C can be prevented. Further, since the protrusion engaging adaptors 122 of the partitioning shelf plate member 120 are provided on longitudinal both ends of the partitioning shelf member 120, the protrusion engaging adaptors 122 are caused to engage with desired shelf mounting protrusions 133 so that the attachment and detachment of the partitioning wall formation member 130 and the partitioning shelf plate member 120 can be easily attained. Thus the effects of the first example of the present invention are very large.

Next, a cables or the like protection and guide device, which is a second example according to the present invention will be described with reference to FIGS. 6 to 8.

Figure 6:
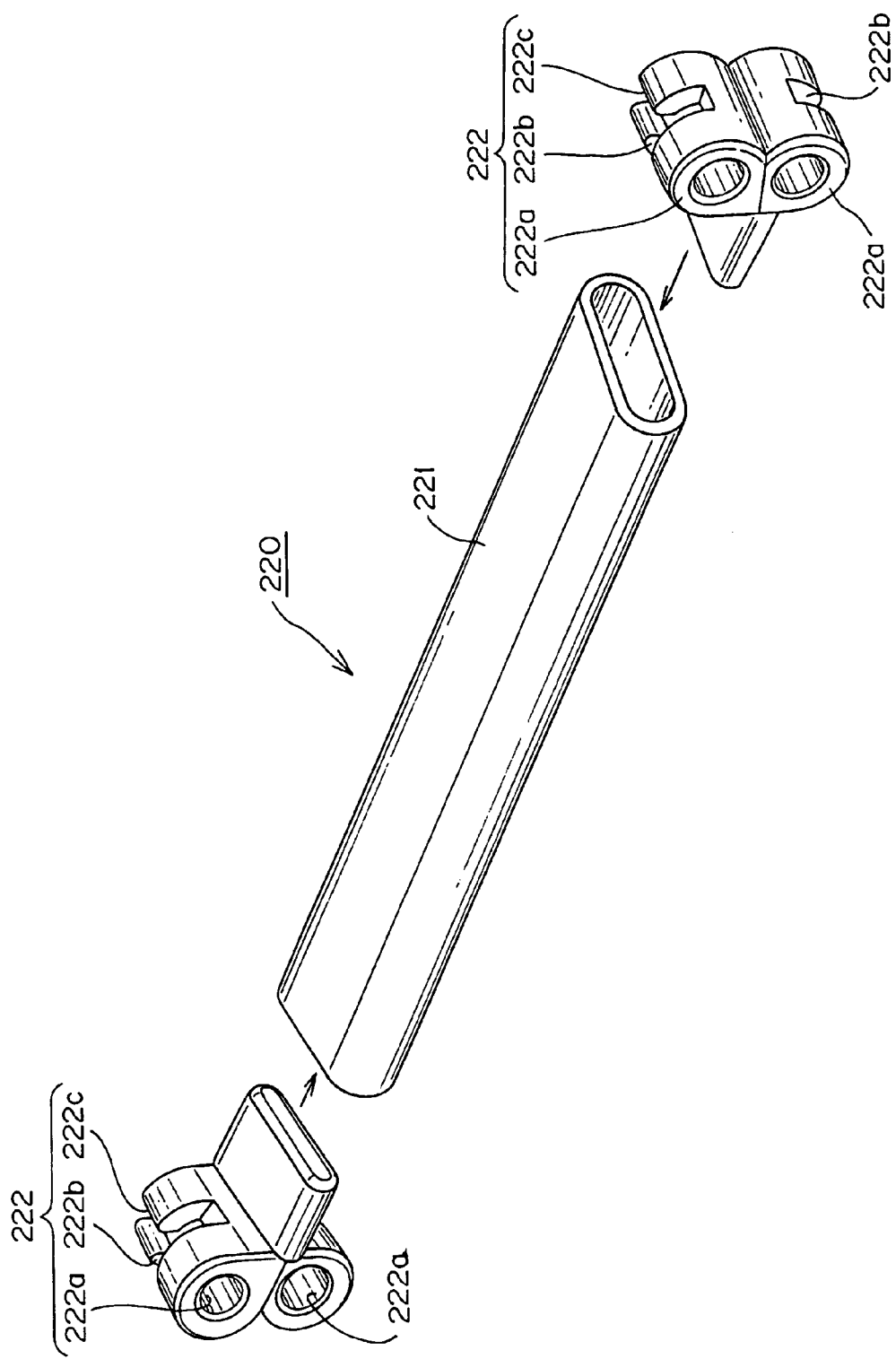
FIG. 6 is a perspective view of a partitioning shelf plate member used in the cables or the like protection and guide device, which is the second example of the present invention.
Figure 7:
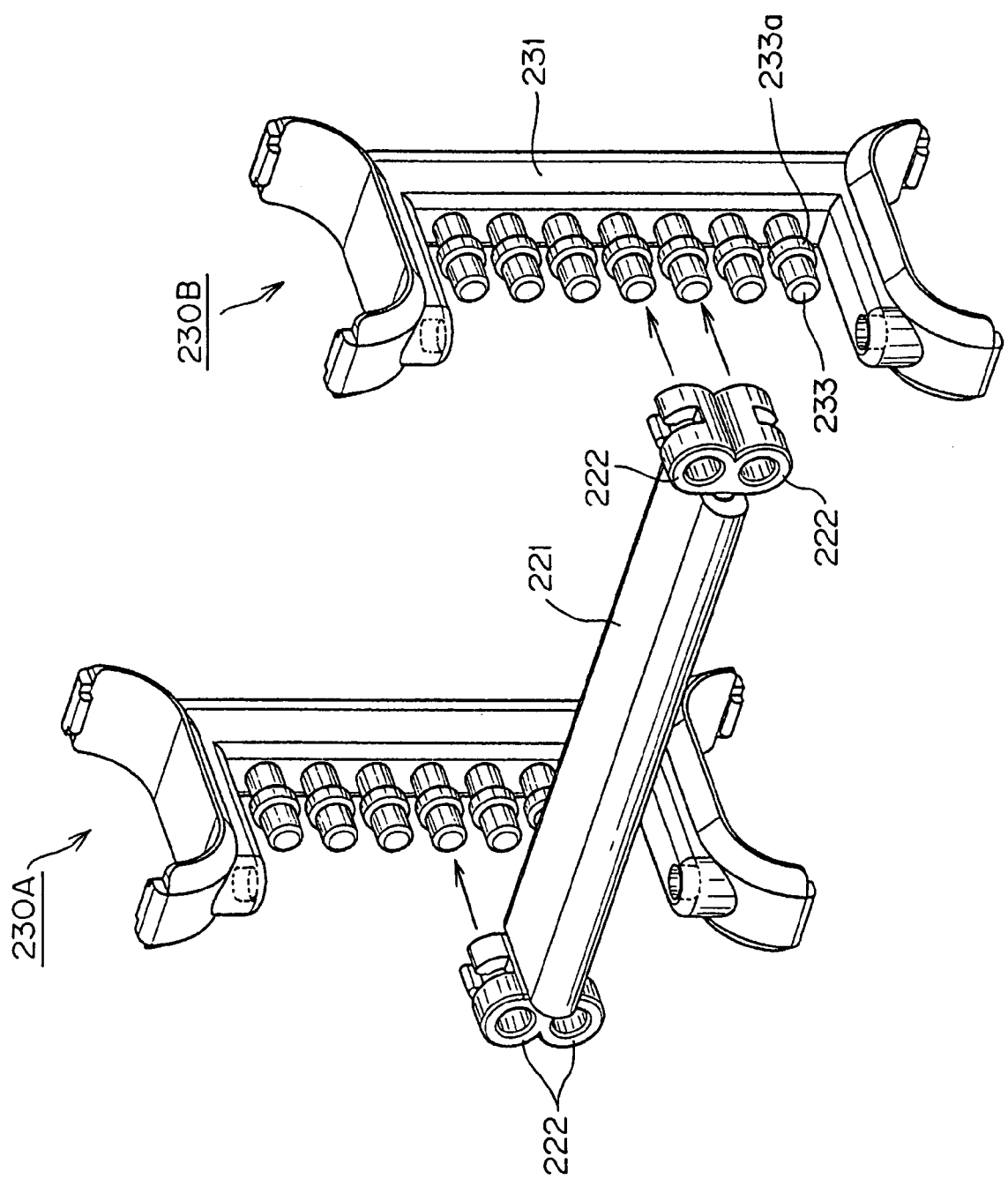
FIG. 7 is a view showing an incorporation state of the partitioning shelf plate member and a partitioning wall formation member.
Figure 8:
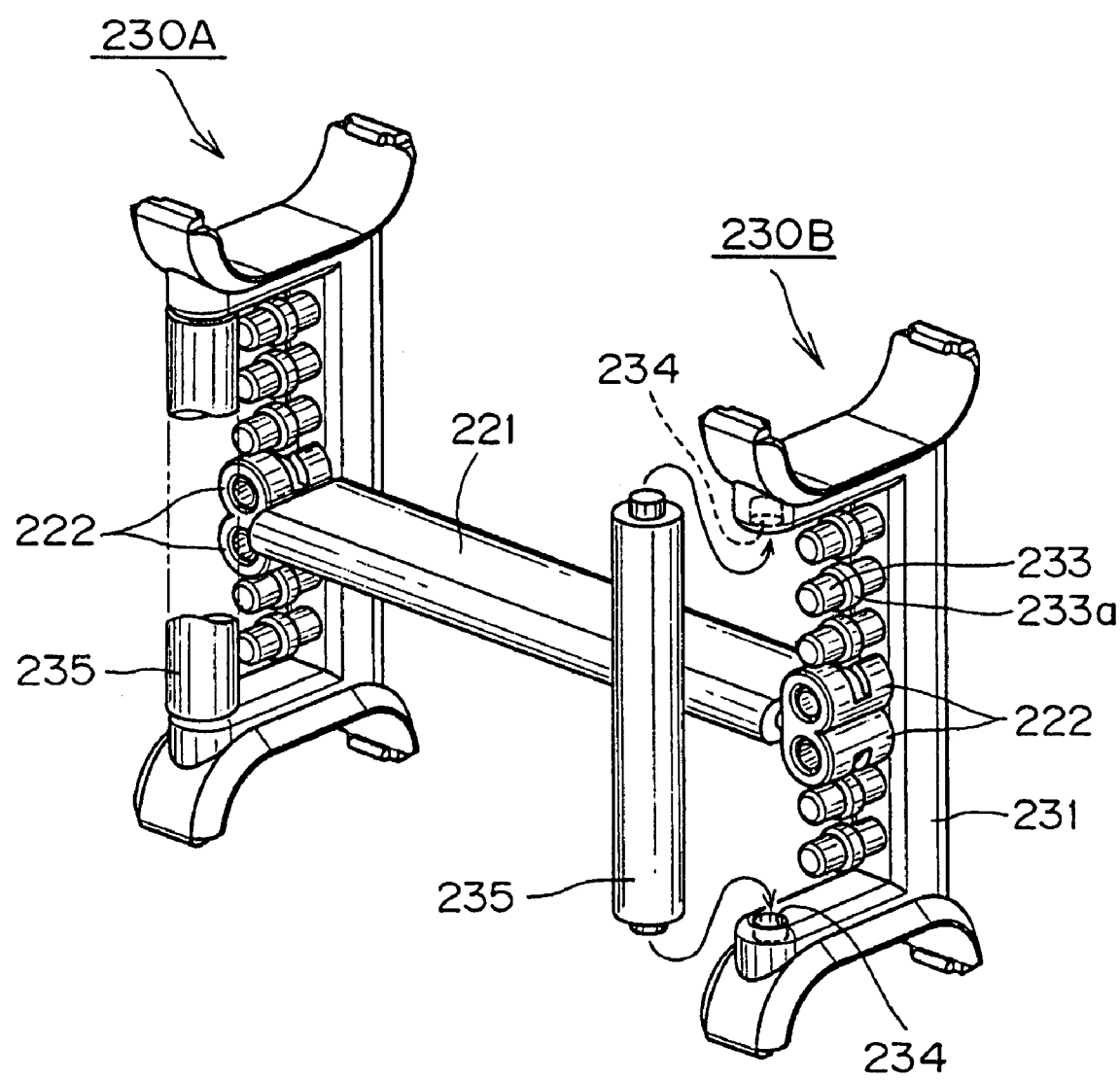
FIG. 8 is a view showing an incorporation state of free rolls.

FIG. 6 is a perspective view of a partitioning shelf plate member 220 used in the cables or the like protection and guide device, which is the second example of the present invention, FIG. 7 is a view showing an incorporation state of the partitioning shelf plate member 220 and a partitioning wall formation member, and FIG. 8 is a view showing an incorporation state of free rolls.

It is noted that as compared with the above-described the cables or the like protection and guide device 100, the cables or the like protection and guide device of the second example is different in a concrete form of the partitioning shelf plate member 220. However, since other device configurations of the first example are not different from the configurations of the first example, the reference numerals of the same configurations of the cables or the like protection and guide device 100 of the above-described first example are denoted by numerals raised by 100, this is two hundreds, and the description of the elements are omitted.

As shown in FIGS. 6 to 8, the most characteristic partitioning shelf plate member 220 in the cables or the like protection and guide device of the second example of the present invention include a shelf plate body 221 like the above-mentioned partitioning shelf plate member 120, and protrusion engaging adaptors 222, 222 detachably attached to both ends of the shelf plate body 221.

Further, the protrusion engaging adaptor 222 is provided with two locking hole portions 222a, 222a, which branch to engage with vertically adjacent two shelf mounting protrusions 233, 233, and a concave dropping prevention portion 222b, which avoids the dropping of the partitioning shelf member 220 by engaging with a convex dropping prevention portion 233a of the partitioning wall formation member 230 with a part of the locking hole portion 222a opened, and further a slit portion 222c, which is continuous to the concave dropping prevention portion 222b for elastic deformation, with a part of the locking hole portion 222a cut out, so that insertion resistance generated on the fitting of the convex dropping prevention portion 333a of the partitioning wall formation member 230 is avoided.

FIGS. 6 to 8 show a case where two partitioning wall formation members 230A, 230B and a partitioning shelf plate member 220 are assembled.

In this case, the partitioning shelf plate member 220 are attached to the two partitioning wall formation members 230A, 230B attached to the bending inner circumferential side connecting plate 112 (not shown). In this case, as shown in FIGS. 6 and 8, the protrusion engaging adaptors 222 provided on each of both ends of the partitioning shelf plate member 220 include two branched engaging hole portions 222a, 222a, which engage with vertically adjacent two partitioning shelf mounting protrusions 233, 233, two engaging hole portions 222a, 222a provided on the protrusion engaging adaptors 222 are attached to shelf mounting protrusions 233 on the fourth steps in the partitioning wall formation members 230A and 230B from their top and to shelf mounting protrusions 233 on the fifth steps in the partitioning wall formation members 230A and 230B from their top so as to be fitted thereto, as shown in FIG. 7. Thus, the partitioning shelf plate member 220 including such protrusion engaging adaptors 222 on both ends of the member 220 are attached to the two partitioning wall formation members 230A and 230B at four positions.

Then, in a state where the partitioning shelf plate member 220 is attached to the partitioning wall formation members 230A and 230B, free rolls 235 are respectively attached to partitioning wall formation members 230A and 230B. When the free rolls 235 are attached, as shown in FIG. 8, after the upper and lower ends of the partitioning wall formation members 230A, 230B are stretched up and down to be deformed, so that protrusion shaft portions of the free rolls 235 are fitted into bearing hole portions 234, 234 of the partitioning wall formation member. Thus the free rolls 135 are pivotably provided in the partitioning wall formation members.

Finally, the bending outer circumferential side connecting plate 213 is closed so that the partitioning wall formation members 230A, 230B are fixed.

Therefore, in the thus obtained cables or the like protection and guide device, which is the second example of the present invention, since the protrusion engaging adaptors 222 are formed so that they engage with vertically adjacent two shelf mounting protrusions 233, 233, even if the load of cables or the like C applied to the partitioning shelf plate member 220 is large, the partitioning shelf plate member 220 is prevented from dropping off from the partitioning wall formation member 230 whereby the damage of the partitioning wall formation member 230 and the partitioning shelf plate member 220 can be prevented, in addition to the effects exerted by the cables or the like protection and guide device 100 of the above-described first example. The effects of the second example of the present invention are very large.

DESCRIPTION OF REFERENCE NUMERALS

100 . . . Cables and the like protection and guide device
110 . . . Link frame body
111 . . . Link plate 112 . . . Bending inner circumferential side connecting plate
113 . . . Bending outer circumferential side connecting plate
114 . . . Connecting pin
115 . . . Connecting pin hole
120, 220 . . . Partitioning shelf plate member
121, 221 . . . Shelf plate body
122, 222 . . . Protrusion engaging adaptor
122a, 222a . . . Locking hole portion
122b, 222b . . . Concave dropping prevention portion
122c, 222c . . . Slit portion
130, 230 . . . Partitioning wall formation member
131, 231 . . . C-shaped frame
132, 232 . . . Pawl portion
133, 233 . . . Shelf mounting protrusion
133a, 233a . . . Convex dropping prevention portion
134, 234 . . . Bearing hole portion
135, 235 . . . Free roll
C . . . Cables or the like
R . . . Cables or the like accommodation space While the invention has been described herein by way of example those skilled in the art will readily recognize that changes and modifications may be made to the invention without departing from the spirit and scope of the appended claims.

I claim:

1. A cable protection and guide device comprising a number of link frame bodies each having a frame with a rectangularly shaped cross-section; each link frame body includes a pair of left and right link plates; each link plate includes a bending inner and outer portion; connecting plates bridged over said bending inner and outer circumferential portions of said right and left link plates; said link plates are flexibly connected to each other with connecting pins and connecting pin holes provided in said link plates; said link frame bodies form a cable accommodation space where inserted cables are guided; partitioning wall formation members; said partitioning wall formation members separate said cable accommodation space into right and left spaces; a partitioning shelf plate member, said partitioning shelf plate member separates said cable accommodation space into a bending inner circumferential portion and a bending outer circumferential portion; characterized in that each of said partitioning wall formation members include a plurality of shelf mounting protrusions; said shelf mounting protrusions are arranged in multiple steps not engaging said cables; said shelf mounting protrusions form a part of a wall surface of said partitioning wall formation member, each of said partitioning shelf plate members include longitudinal ends; each of said longitudinal ends of said partitioning shelf plate members include an adapter; each of said shelf mounting protrusions of said partioning wall formation members includes a convex portion; each of said adapters include a concave portion; and, each of said concave portions of said adapters interfits a respective convex portion of each said shelf mounting protrusion to prevent disengagement of said partioning shelf plate members from said partitioning wall formation members.

2. A cable protection and guide device according to claim 1, characterized in that each protrusion engaging adapter includes two diverged locking hole portions which engage two of said shelf mounting protrusions, and, said shelf mounting protrusions are vertical and adjacent with respect to said diverged locking hole portions.

3. A cable protection and guide device comprising a number of link frame bodies each having a frame with a rectangularly shaped cross-section; each link frame body includes a pair of left and right link plates; each link plate includes a bending inner and outer portion; connecting plates bridged over said bending inner and outer circumferential portions of said right and left link plates; said link plates are flexibly connected to each other with connecting pins and connecting pin holes provided in said link plates; said link frame bodies form a cable accommodation space where inserted cables are guided; partitioning wall formation members; said partitioning wall formation members separate said cable accommodation space into right and left spaces; a partitioning shelf plate member; said partitioning shelf plate member separates said cable accommodation space into a bending inner circumferential portion and a bending outer circumferential portion; characterized in that each of said partitioning wall formation members include a plurality of shelf mounting protrusions; said shelf mounting protrusions are arranged in multiple steps not engaging said cables; said shelf mounting protrusions form a part of a wall surface of said partitioning wall formation member, each of said partitioning shelf plate members include longitudinal ends; each of said longitudinal ends of said partitioning shelf plate members include an adapter; each of said shelf mounting protrusions of said partitioning wall formation members includes a convex portion; each of said adapters include a concave portion; each of said concave portions of said adapters interfits a respective convex portion of a respective shelf mounting protrusion to prevent disengagement of said partioning shelf plate members from said partitioning wall formation members; and, each of said protrusion engaging adapters includes two diverged locking hole portions engaging two of said shelf mounting protrusions which are vertical and adjacent to said diverged locking hole portions.

* * * * *